United States Patent Office 3,280,152
Patented Oct. 18, 1966

3,280,152
EPOXY ALCOHOL COMPOUNDS
Samuel W. Tinsley, South Charleston, and Paul S. Starcher, Charleston, W. Va., assignors to Union Carbide Corporation, a corporation of New York
No Drawing. Filed Sept. 13, 1960, Ser. No. 55,730
31 Claims. (Cl. 260—348)

This invention relates to the preparation of novel epoxy alcohol compounds which are useful as plasticizers and stabilizers for vinyl halide resins.

It is deemed pertinent at this time to set forth several illustrations of the novel epoxy alcohol compounds which are encompassed within the scope of the invention in view of the complexity of the chemical nomenclature involved. In general, the "polycyclo" nomenclature system has been adopted throughout the specification except in a few instances where a second name appears to be more apropos. Thus, the compound, 4-oxatetracyclo[6.2.1.0$^{2,7}$.0$^{3,5}$]undecan-9-ol, is structurally depicted as follows:

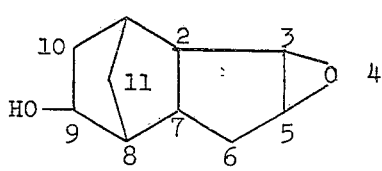

The compound, 10-oxapentacyclo[6.3.1.1$^{3,6}$.0$^{2,7}$.0$^{9,11}$]tridecan-4-ol is shown below:

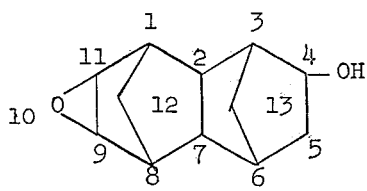

The following structural formula designates the compound, 10-oxapentacyclo[6.3.1.1$^{3,6}$.0$^{2,7}$.0$^{9,11}$]tridec-4,5-ylenedialkanol.

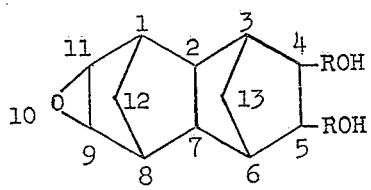

Lastly, the compound, 10-oxapentacyclo[6.3.1.1$^{3,6}$.0$^{2,7}$.0$^{9,11}$]tridec-4-ylmethyleneoxyalkanol, is illustrated as follows:

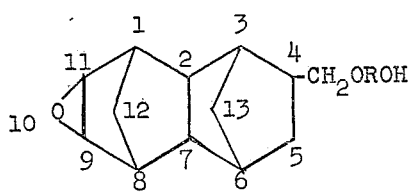

This latter compound is named, also, in this specification as being an ether, i.e., hydroxyalkyl 10-oxapentacyclo-[6.3.1.1$^{3,6}$.0$^{2,7}$.0$^{9,11}$]tridec-4-ylmethyl ether.

The novel and useful epoxy alcohols which are contemplated in the invention include:

(a) 4-oxatetracyclo[6.2.1.0$^{2,7}$.0$^{3,5}$]undecan-9-ol,
(b) 4-oxatetracyclo[6.2.1.0$^{2,7}$.0$^{3,5}$]undec-9-oxyalkanol,
(c) 4-oxatetracyclo[6.2.1.0$^{2,7}$.0$^{3,5}$]undec-9-oxyalkane-poly-ol,
(d) 4-oxatetracyclo[6.2.1.0$^{2,7}$.0$^{3,5}$]undecane-9-10-diol,
(e) 4-oxatetracyclo[6.2.1.0$^{2,7}$.0$^{3,5}$]undecane-10,11-diol,
(f) 10-oxapentacyclo[6.3.1.1$^{3,6}$.0$^{2,7}$.0$^{9,11}$]tridecan-4-ol,
(g) 10-oxapentacyclo[6.3.1.1$^{3,6}$.0$^{2,7}$.0$^{9,11}$]tridecane-4,5-diol
(h) 10-oxapentacyclo[6.3.1.1$^{3,6}$.0$^{2,7}$.0$^{9,11}$]tridec-4-ylalkanol,
(i) 10-oxapentacyclo[6.3.1.1$^{3,6}$.0$^{2,7}$.0$^{9,11}$]tridec-4,5-ylene-dialkanol,
(j) 10-oxapentacyclo[6.3.1.1$^{3,6}$.0$^{2,7}$.0$^{9,11}$]tridec-4-oxy-alkanol,
(k) 10-oxapentacyclo[6.3.1.1$^{3,6}$.0$^{2,7}$.0$^{9,11}$]tridec-4-oxy-alkane-poly-ol,
(l) 10-oxapentacyclo[6.3.1.1$^{3,6}$.0$^{2,7}$.0$^{9,11}$]tridec-4-ylmethyleneoxyalkanol,
(m) 10-oxapentacyclo[6.3.1.1$^{3,6}$.0$^{2,7}$.0$^{9,11}$]tridec-4-ylmethyleneoxyalkane-poly-ol,
(n) the 4-oxatetracyclo[6.2.1.0$^{2,7}$.0$^{3,5}$]undec-9-oxy(mono- and polyalkyleneoxy)alkanols, which result from the monoepoxidation of the reaction products of tricyclo-[5.2.1.0$^{2,6}$]dec-3-en-8-ol with a saturated aliphatic mono vicinal-epoxyhydrocarbon.
(o) the 4-oxatetracyclo[6.2.1.0$^{2,7}$.0$^{3,5}$]undec-9,10-ylene-di[oxy(mono- and polyalkyleneoxy)alkanols] which result from the monoepoxidation of the reaction products of tricyclo[5.2.1.0$^{2,6}$]dec-3-ene-8,9-diol with a saturated aliphatic mono vicinal-epoxyhydrocarbon,
(p) the 4-oxatetracyclo[6.2.1.0$^{2,7}$.0$^{3,5}$]undec-10,11-ylene-di[oxy(mono- and polyalkyleneoxy)alkanols] which result from the monoepoxidation of the reaction products of tricyclo[5.2.1.0$^{2,6}$]dec-3-ene-9,10-diol with a saturated aliphatic mono vicinal-epoxyhydrocarbon,
(q) the 10-oxapentacyclo[6.3.1.1$^{3,6}$.0$^{2,7}$.0$^{9,11}$]tridec-4-oxy-(mono- and polyalkyleneoxy) alkanols which result from the monoepoxidation of the reaction products of tetracyclo[5.2.1.0$^{2,6}$]dodec-9-en-4-ol with a saturated aliphatic mono vicinal-epoxyhydrocarbon,
(r) the 10-oxapentacyclo[6.3.1.1$^{3,6}$.0$^{2,7}$.0$^{9,11}$]tridec-4,5-ylene-di[oxy(mono- and polyalkyleneoxy)alkanols] which result from the monoepoxidation of the reaction products of tetracyclo[6.2.1.1$^{3,6}$.0$^{2,7}$]dodec-9-ene-4,5-diol with a saturated aliphatic mono vicinal-epoxyhydrocarbon,
(s) 10-oxapentacyclo[6.3.1.1$^{3,6}$.0$^{2,7}$.0$^{9,11}$]tridec-4-ylalkyleneoxyalkanol,
(t) the 10-oxapentacyclo[6.3.1.1$^{3,6}$.0$^{2,7}$.0$^{9,11}$]tridec-4-yl-alkyleneoxy(mono- and polyalkyleneoxy)alkanols which result from the monoepoxidation of the reaction products of tetracyclo[6.2.1.1$^{3,6}$.0$^{2,7}$]dodec-9-en-4-yl-alkanol with a saturated aliphatic mono vicinal-epoxyhydrocarbon,
(u) 10-oxapentacyclo[6.3.1.1$^{3,6}$.0$^{2,7}$.0$^{9,11}$]tridec-4,5-ylene-di(alkyleneoxyalkanol), and
(v) the 10-oxapentacyclo[6.3.1.1$^{3,6}$.0$^{2,7}$.0$^{9,11}$]tridec-4,5-ylene-di[alkyleneoxy(mono- and polyalkyleneoxy)alkanols] which result from the monoepoxidation of the reaction products of tetracyclo[6.2.1.1$^{2,6}$.0$^{2,7}$]dodec-9-en-4,5-ylene-dialkanol with a saturated aliphatic mono vicinal-epoxyhydrocarbon.

Specific examples of the 4-oxatetracyclo[6.2.1.0$^{2,7}$.0$^{3,5}$] undec-9-oxyalkanols include, for instance, 4-oxatetracyclo[6.2.1.0$^{2,7}$.0$^{3,5}$]undec-9-oxy-n-pentanol,
4-oxatetracyclo[6.2.1.0$^{2,7}$.0$^{3,5}$]undec-9-oxyethanol,
4-oxatetracyclo[6.2.1.0$^{2,7}$.0$^{3,5}$]undec-9-oxy-n-propanol,
4-oxatetracyclo[6.2.1.0$^{2,7}$.0$^{3,5}$]undec-9-oxyisopropanol,
4-oxatetracyclo[6.2.1.0$^{2,7}$.0$^{3,5}$]undec-9-oxy-n-butanol,
4-oxatetracyclo[6.2.1.0$^{2,7}$.0$^{3,5}$]undec-9-oxyisobutanol,
4-oxatetracyclo[6.2.1.0$^{2,7}$.0$^{3,5}$]undec-9-oxy-t-butanol,
4-oxatetracyclo[6.2.1.0$^{2,7}$.0$^{3,5}$]undec-9-oxy-n-hexanol, 4-oxatetracyclo[6.2.1.0$^{2,7}$.0$^{3,5}$]undec-9-oxy-n-octanol,
4-oxatetracyclo[6.2.1.0$^{2,7}$.0$^{3,5}$]undec-9-oxy-n-decanol,
and the like.

Illustrative examples of the 4 - oxatetracyclo[6.2.1.0$^{2,7}$.0$^{3,5}$]undec-9-oxyalkane-poly-ols which are contemplated include, for instance, the 4-oxatetracyclo[6.2.1.0$^{2,7}$.0$^{3,5}$]undec-9-oxyalkanediols, e.g., the 4-oxatetracyclo[6.2.1.0$^{2,7}$.0$^{3,5}$]undec-9-oxy-propanediols,
the 4-oxatetracyclo[6.2.1.0$^{2,7}$.0$^{3,5}$]undec-9-oxy-butanediols,
the 4-oxatetracyclo[6.2.1.0$^{2,7}$.0$^{3,5}$]undec-9-oxy-pentanediols,
the 4-oxatetracyclo[6.2.1.0$^{2,7}$.0$^{3,5}$]undec-9-oxy-hexanediols, and the like;
the 4-oxatetracyclo[6.2.1.0$^{2,7}$.0$^{3,5}$]undec-9-oxy-alkanetriols, e.g.,
the 4-oxatetracyclo[6.2.1.0$^{2,7}$.0$^{3,5}$]undec-9-oxy-butanetriols,
the 4-oxatetracyclo[6.2.1.0$^{2,7}$.0$^{3,5}$]undec-9-oxy-pentanetriols,
the 4-oxatetracyclo[6.2.1.0$^{2,7}$.0$^{3,5}$]undec-9-oxy-hexanetriols,
the 4-oxatetracyclo[6.2.1.0$^{2,7}$.0$^{3,5}$]undec-9-oxy-octanetriols, and the like;
the 4-oxatetracyclo[6.2.1.0$^{2,7}$.0$^{3,5}$]undec-9-oxy-alkanetetrols, e.g.,
the 4-oxatetracyclo[6.2.1.0$^{2,7}$.0$^{3,5}$]undec-9-oxy-hexanetetrols; and the like;
the 4-oxatetracyclo[6.2.1.0$^{2,7}$.0$^{3,5}$]undec-9-oxy-alkanepentols; and the like.

Typical 10 - oxapentacyclo[6.3.1.1$^{3,6}$.0$^{2,7}$.0$^{9,11}$]tridec-4-yl-alkanols include, among others, 10-oxapentacyclo[6.3.1.1$^{3,6}$.0$^{2,7}$.0$^{9,11}$]tridec-4-yl-methanol,
10-oxapentacyclo[6.3.1.1$^{3,6}$.0$^{2,7}$.0$^{9,11}$]tridec-4-yl-ethanol,
10-oxapentacyclo[6.3.1.1$^{3,6}$.0$^{2,7}$.0$^{9,11}$]tridec-4-yl-n-propanol,
10-oxapentacyclo[6.3.1.1$^{3,6}$.0$^{2,7}$.0$^{9,11}$]tridec-4-yl-isopropanol,
10-oxapentacyclo[6.3.1.1$^{3,6}$.0$^{2,7}$.0$^{9,11}$]tridec-4-yl-n-butanol,
10-oxapentacyclo[6.3.1.1$^{3,6}$.0$^{2,7}$.0$^{9,11}$]tridec-4-yl-t-butanol,
10-oxapentacyclo[6.3.1.1$^{3,6}$.0$^{2,7}$.0$^{9,11}$]tridec-4-yl-isobutanol,
10-oxapentacyclo[6.3.1.1$^{3,6}$.0$^{2,7}$.0$^{9,11}$]tridec-4-yl-isohexanol,
10-oxapentacyclo[6.3.1.1$^{3,6}$.0$^{2,7}$.0$^{9,11}$]tridec-4-yl-n-octan-2-ol,
10-oxapentacyclo[6.3.1.1$^{3,6}$.0$^{2,7}$.0$^{9,11}$]tridec-4-yl-n-decanol, and the like.

Among the 10-oxapentacyclo[6.3.1.1$^{3,6}$.0$^{2,7}$.0$^{9,11}$]tridec-4-oxyalkanols which are encompassed within the scope of the invention are, for example, 10-oxapentacyclo[6.3.1.1$^{3,6}$.0$^{2,7}$.0$^{9,11}$]tridec-4-oxy-n-pentanol,
10-oxapentacyclo[6.3.1.1$^{3,6}$.0$^{2,7}$.0$^{9,11}$]tridec-4-oxy-ethanol,
10-oxapentacyclo[6.3.1.1$^{3,6}$.0$^{2,7}$.0$^{9,11}$]tridec-4-oxy-n-propanol,
10-oxapentacyclo[6.3.1.1$^{3,6}$.0$^{2,7}$.0$^{9,11}$]tridec-4-oxy-isopropanol,
10-oxapentacyclo[6.3.1.1$^{3,6}$.0$^{2,7}$.0$^{9,11}$]tridec-4-oxy-n-butanol,
10-oxapentacyclo[6.3.1.1$^{3,6}$.0$^{2,7}$.0$^{9,11}$]tridec-4-oxy-isobutanol,
10-oxapentacyclo[6.3.1.1$^{3,6}$.0$^{2,7}$.0$^{9,11}$]tridec-4-oxy-t-butanol,
10-oxapentacyclo[6.3.1.1$^{3,6}$.0$^{2,7}$.0$^{9,11}$]tridec-4-oxy-n-hexanol,
10-oxapentacyclo[6.3.1.1$^{3,6}$.0$^{2,7}$.0$^{9,11}$]tridec-4-oxy-n-octan-4-ol,
10-oxapentacyclo[6.3.1.1$^{3,6}$.0$^{2,7}$.0$^{9,11}$]tridec-4-oxy-n-dodecanol, and the like.

Illustrative 10-oxapentacyclo[6.3.1.1$^{3,6}$.0$^{2,7}$.0$^{9,11}$]tridec-4-oxyalkane-poly-ols include, for instance, the 10-oxapentacyclo[6.3.1.1$^{3,6}$.0$^{2,7}$.0$^{9,11}$]tridec - 4 - oxyalkanediols, e.g., the 10 - oxapentacyclo[6.3.1.1$^{3,6}$.0$^{2,7}$.0$^{9,11}$]tridec - 4- oxy-propanediols, the 10-oxapentacyclo[6.3.1.1$^{3,6}$.0$^{2,7}$.0$^{9,11}$]tridec-4-oxy-butanediols,
the 10-oxapentacyclo[6.3.1.1$^{3,6}$.0$^{2,7}$.0$^{9,11}$]tridec-4-oxy-pentanediols,
the 10-oxapentacyclo[6.3.1.1$^{3,6}$.0$^{2,7}$.0$^{9,11}$]tridec-4-oxy-hexanediols, and the like;
the 10-oxapentacyclo[6.3.1.1$^{3,6}$.0$^{2,7}$.0$^{9,11}$]tridec-4-oxy-alkanetriols, e.g.,
the 10-oxapentacyclo[6.3.1.1$^{3,6}$.0$^{2,7}$.0$^{9,11}$]tridec-4-oxy-butanetriols,
the 10-oxapentacyclo[6.3.1.1$^{3,6}$.0$^{2,7}$.0$^{9,11}$]tridec-4-oxy-pentanetriols,
the 10-oxapentacyclo[6.3.1.1$^{3,6}$.0$^{2,7}$.0$^{9,11}$]tridec-4-oxy-hexanetriols,
the 10-oxapentacyclo[6.3.1.1$^{3,6}$.0$^{2,7}$.0$^{9,11}$]tridec-4-oxy-octanetriols,
the 10-oxapentacyclo[6.3.1.1$^{3,6}$.0$^{2,7}$.0$^{9,11}$]tridec-4-oxy-nonanetriols, and the like;
the 10-oxapentacyclo[6.3.1.1$^{3,6}$.0$^{2,7}$.0$^{9,11}$]tridec-4-oxy-alkanetetrols, e.g.,
the 10-oxapentacyclo[6.3.1.1$^{3,6}$.0$^{2,7}$.0$^{9,11}$]tridec-4-oxy-hexanetetrols, and the like;
the 10-oxapentacyclo[6.3.1.1$^{3,6}$.0$^{2,7}$.0$^{9,11}$]tridec-4-oxy-alkanepentols; and the like.

Typical 10 - oxapentacyclo[6.3.1.1$^{3,6}$.0$^{2,7}$.0$^{9,11}$]tridec-4-yl-methyleneoxyalkanols include, among others, 10-oxapentacyclo[6.3.1.1$^{3,6}$.0$^{2,7}$.0$^{9,11}$]tridec-4-yl-methyleneoxy-n-pentanol,
10-oxapentacyclo[6.3.1.1$^{3,6}$.0$^{2,7}$.0$^{9,11}$]tridec-4-yl-methyleneoxyethanol,
10-oxapentacyclo[6.3.1.1$^{3,6}$.0$^{2,7}$.0$^{9,11}$]tridec-4-yl-methyleneoxy-n-propanol,
10-oxapentacyclo[6.3.1.1$^{3,6}$.0$^{2,7}$.0$^{9,11}$]tridec-4-yl-methyleneoxyisopropanol,
10-oxapentacyclo[6.3.1.1$^{3,6}$.0$^{2,7}$.0$^{9,11}$]tridec-4-yl-methyleneoxy-n-butanol,
10-oxapentacyclo[6.3.1.1$^{3,6}$.0$^{2,7}$.0$^{9,11}$]tridec-4-yl-methyleneoxy-t-butanol,
10-oxapentacyclo[6.3.1.1$^{3,6}$.0$^{2,7}$.0$^{9,11}$]tridec-4-yl-methyleneoxy-n-hexanol,
10-oxapentacyclo[6.3.1.1$^{3,6}$.0$^{2,7}$.0$^{9,11}$]tridec-4-yl-methyleneoxy-n-octanol,
10-oxapentacyclo[6.3.1.1$^{3,6}$.0$^{2,7}$.0$^{9,11}$]tridec-4-yl-methyleneoxy-n-dodecanol, and the like.

Illustrative 10-oxapentacyclo[6.3.1.1$^{3,6}$.0$^{2,7}$.0$^{9,11}$]tridec-4-ylmethyleneoxyalkane-poly-ols which are contemplated include, for instance, the 10-oxapentacyclo[6.3.1.1$^{3,6}$.0$^{2,7}$.0$^{9,11}$]tridec-4-yl-methyleneoxyalkanediols, e.g.,
the 10-oxapentacyclo[6.3.1.1$^{3,6}$.0$^{2,7}$.0$^{9,11}$]tridec-4-yl-methyleneoxypropanediols,
the 10-oxapentacyclo[6.3.1.1$^{3,6}$.0$^{2,7}$.0$^{9,11}$]tridec-4-yl-methyleneoxybutanediols,
the 10-oxapentacyclo[6.3.1.1$^{3,6}$.0$^{2,7}$.0$^{9,11}$]tridec-4-yl-methyleneoxypentanediols,
the 10-oxapentacyclo[6.3.1.1$^{3,6}$.0$^{2,7}$.0$^{9,11}$]tridec-4-yl-methyleneoxyhexanediols,
the 10-oxapentacyclo[6.3.1.1$^{3,6}$.0$^{2,7}$.0$^{9,11}$]tridec-4-yl-methyleneoxyoctanediols, and the like;
the 10-oxapentacyclo[6.3.1.1$^{3,6}$.0$^{2,7}$.0$^{9,11}$]tridec-4-yl-methyleneoxyalkanetriols, e.g.,
the 10-oxapentacyclo[6.3.1.1$^{3,6}$.0$^{2,7}$.0$^{9,11}$]tridec-4-yl-methyleneoxybutanetriols, the 10-oxapentacyclo[6.3.1.1$^{3,6}$.0$^{2,7}$.0$^{9,11}$]tridec-4-ylmethyleneoxypentanetriols, the 10-oxapentacyclo[6.3.1.1$^{3,6}$.0$^{2,7}$.0$^{9,11}$]tridec-4-ylmethyleneoxyhexanetriols, the 10-oxapentacyclo[6.3.1.1$^{3,6}$.0$^{2,7}$.0$^{9,11}$]tridec-4-ylmethyleneoxyoctanetriols, the 10-oxapentacyclo[6.3.1.1$^{3,6}$.0$^{2,7}$.0$^{9,11}$]tridec-4-ylmethyleneoxynonanetriols, and the like;

the 10-oxapentacyclo[6.3.1.1$^{3,6}$.0$^{2,7}$.0$^{9,11}$]tridec-4-ylmethyleneoxyalkanetetrols, e.g., the 10-oxapentacyclo[6.3.1.1$^{3,6}$.0$^{2,7}$.0$^{9,11}$]tridec-4-ylmethyleneoxyhexanetetrols, and the like;

the 10-oxapentacyclo[6.3.1.1$^{3,6}$.0$^{2,7}$.0$^{9,11}$]tridec-4-ylmethyleneoxyalkanepentols;

and the like.

The 10-oxapentacyclo[6.3.1.1$^{3,6}$.0$^{2,7}$.0$^{9,11}$]tridec-4,5-ylene-dialkanols are exemplified, preferably, by such compounds as 10-oxapentacyclo[6.3.1.1$^{3,6}$.0$^{2,7}$.0$^{9,11}$]tridec-4,5-ylene-dimethanol, 10-oxapentacyclo[6.3.1.1$^{3,6}$.0$^{2,7}$.0$^{9,11}$]tridec-4,5-ylene-diethanol, and the like.

The preparation of 4-oxatetracyclo[6.2.1.0$^{2,7}$.0$^{3,5}$]undecan-9-ol is effected by the reaction of dicyclopentadiene with an aqueous solution of an inorganic acidic catalyst, e.g., an aqueous solution of 25 weight percent sulfuric acid, at an elevated temperature, e.g., from about 75° C. and lower, to about 125° C., and higher, and for a period of time sufficient to produce tricyclo[5.2.1.0$^{2,6}$]dec-3-en-8-ol as the product. Epoxidation of the resulting olefinically unsaturated alcohol product results in 4-oxatetracyclo[6.2.1.0$^{2,7}$.0$^{3,5}$]undecan-9-ol. It is pointed out at this time that the epoxidation reaction of the olefinically unsaturated alcohol precursors which result in the novel epoxy alcohol compounds that are encompassed within the scope of the invention will be described in detail at a later section of the specification.

The preparation of 4-oxatetracyclo[6.2.1.0$^{2,7}$.0$^{3,5}$]undec-9-oxyalkanol, 4-oxatetracyclo[6.2.1.0$^{2,7}$.0$^{3,5}$]undec-9-oxyalkane-poly-ol, 10-oxapentacyclo[6.3.1.1$^{3,6}$.0$^{2,7}$.0$^{9,11}$]tridec-4-oxyalkanol, or 10-oxapentacyclo[6.3.1.1$^{3,6}$.0$^{2,7}$.0$^{9,11}$]tridec-4-oxyalkane-poly-ol is accomplished, for example, by reacting a molar excess of a polyhydric alcohol, e.g., ethylene glycol, glycerol, 1,2,6-hexanetriol, erythritol, pentaerythritol, and the like, with dicyclopentadiene or tetracyclo[6.2.1.1$^{3,6}$.0$^{2,7}$]dodeca-4,9-diene, in the presence of boron trifluoride catalyst, at an elevated temperature, e.g., from about 50° C., and lower, to about 125° C., and higher, and for a period of time to produce tricyclo[5.2.1.0$^{2,6}$]dec-3-en-8-oxyalkanol, tricyclo[5.2.1.0$^{2,6}$]dec-3-en-8-oxyalkane-poly-ol, tetracyclo[6.2.1.1$^{3,6}$.0$^{2,7}$]dodec-9-en-4-oxyalkanol, or tetracyclo[6.2.1.1$^{3,6}$.0$^{2,7}$]dodec-9-en-4-oxyalkane-poly-ol as the product. Epoxidation of the resulting product gives the novel epoxy alcohol compounds under consideration.

The preparation of 4-oxatetracyclo[6.2.1.0$^{2,7}$.0$^{3,5}$]undecane-9,10-diol or 10-oxapentacyclo[6.3.1.1$^{3,6}$.0$^{2,7}$.0$^{9,11}$]tridecane-4,5-diol is effected, for example, by reacting dicyclopentadiene or tetracyclo[6.2.1.1$^{3,6}$.0$^{2,7}$]dodeca-4,9-diene with aqueous hydrogen peroxide (equimolar concentration), in the presence of osmium tetroxide catalyst, at an elevated temperature, and for a period of time sufficient to produce tricyclo[5.2.1.0$^{2,6}$]dec-3-ene-8,9-diol or tetracyclo[6.2.1.1$^{3,6}$.0$^{2,7}$]dodec-9-ene-4,5-diol as the product. Epoxidation of the resulting product produces the novel epoxy alcohol compound.

Monomeric 4-oxatetracyclo[6.2.1.0$^{2,7}$.0$^{3,5}$]undecane-10,11-diol can be prepared by the reaction of dicyclopentadiene and lead tetraacetate, under the influence of heat, to yield tricyclo[5.2.1.0$^{2,6}$]dec-3-ene-9,10-diol, followed by epoxidizing said diol to obtain the novel epoxy alcohol compound in question.

The preparation of 10-oxapentacyclo[6.3.1.1$^{3,6}$.0$^{2,7}$.0$^{9,11}$]tridecan-4-ol is as follows. The Diels-Alder reaction of equimolar quantities of cyclopentadiene and vinyl acetate results in 5-acetoxy-bicyclo[2.2.1]hept-2-ene. Subsequent reaction of the bicyclo product with cyclopentadiene yields 4-acetoxy-tetracyclo[6.2.1.1$^{3,6}$.0$^{2,7}$]dodec-9-ene. The reaction of the tetracyclo product with potassium hydroxide yields tetracyclo[6.2.1.1$^{3,6}$.0$^{2,7}$]dodec-9-en-4-ol which can be epoxidized to give the novel epoxy alcohol compound under discussion.

The preparation of 10-oxapentacyclo[6.3.1.1$^{3,6}$.0$^{2,7}$.0$^{9,11}$]tridec-4-ylmethyleneoxyalkanol, 10-oxapentacyclo[6.3.1.1$^{3,6}$.0$^{2,7}$.0$^{9,11}$]tridec-4-ylmethyleneoxyalkane-poly-ol, 10-oxapentacyclo[6.3.1.1$^{3,6}$.0$^{2,7}$.0$^{9,11}$]tridec-4-ylalkanol, or 10-oxapentacyclo[6.3.1.1$^{3,6}$.0$^{2,7}$.0$^{9,11}$]tridec-4,5-ylene-dialkanol, also, can be prepared via the Diels-Alder synthesis route, followed by epoxidizing the Diels-Alder product. For instance, the reaction of at least two mols of cyclopentadiene with one mol of alkenol, allyl hydroxyalkyl ether, allyl polyhydroxyalkyl ether, or alkenediol will yield tetracyclo[6.2.1.1$^{3,6}$.0$^{2,7}$]dodec-9-en-4-ylalkanol, tetracyclo[6.2.1.1$^{3,6}$.0$^{2,7}$]dodec-9-en-4-ylmethyleneoxyalkanol, tetracyclo[6.2.1.1$^{3,6}$.0$^{2,7}$]dodec-9-en-4-ylmethyleneoxyalkane-poly-ol, or tetracyclo[6.2.1.1$^{3,6}$.0$^{2,7}$]dodec-9-en-4,5-ylenedialkanol, respectively. Epoxidation of these olefinically unsaturated alcohol precursors will produce the novel epoxy alcohol compounds under consideration.

The 4-oxatetracyclo[6.2.1.0$^{2,7}$.0$^{3,5}$]undec-9-oxy(mono- and polyalkyleneoxy)alkanols can be prepared by reacting one mol of tricyclo[5.2.1.0$^{2,6}$]dec-3-en-8-ol with at least two mols and upwards to 100 mols, or more, of a saturated aliphatic mono vicinal-epoxyhydrocarbon (hereinafter termed "olefin oxide"), e.g., ethylene oxide, 1,2-epoxypropane, 1,2-epoxybutane, 2,3-epoxybutane, styrene oxide, 1,2-epoxyoctane, 1,2-epoxydodecane, 1,2-epoxyoctadecane, 1-phenyl-2,3-epoxybutane, 1-cyclohexyl-2,3-epoxypentane, and the like; in the presence of an alkali metal hydroxide catalyst, e.g., about 0.1 weight percent potassium hydroxide, based on the total weight of the reactants; under essentially anhydrous conditions; and at an elevated temperature, e.g., from about 90° C. and lower, to about 140° C., and higher. If desired, the reaction product mixture can be purified by washing with water or an aqueous acetic acid solution to remove or neutralize the residual catalyst. The resulting product, i.e., tricyclo[5.2.1.0$^{2,6}$]dec-3-en-8-oxy(mono- or polyalkyleneoxy) alkanol, then can be reacted with an epoxidizing agent to yield the novel epoxy alcohol compound. The following structural formula characterizes the 4-oxatetracyclo[6.2.1.0$^{2,7}$.0$^{3,5}$]undec-9-oxy(mono- and polyalkyleneoxy)alkanols:

(I)

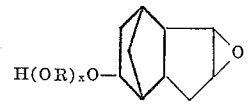

wherein $x$ is a number having an average value of at least 2 (and upwards to 100, and greater), and wherein R is a divalent saturated aliphatic hydrocarbon radical. It is to be noted that $x$ has an average value since the epoxy alcohol product which results from the reaction is not composed of discrete, identical molecules, but rather, the product is composed of molecules in which the value for $x$ can vary over a broad range.

The 4-oxatetracyclo[6.2.1.0$^{2,7}$.0$^{3,5}$]undec-9,10-ylenedi[oxy(mono- and polyalkyleneoxy)alkanols] can be prepared by reacting one mol of tricyclo[5.2.1.0$^{2,6}$]dec-3-ene-8,9-diol with at least 4 mols of an olefin oxide, followed by epoxidation, in the manner explained supra. These novel epoxy alcohols can be characterized as follows:

(II)

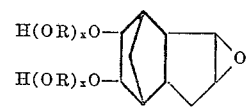

wherein each $x$, individually, is a number having an average value of at least 2 (and upwards to 100 and greater), and wherein R is a divalent saturated aliphatic hydrocarbon radical.

The 4-oxatetracyclo[6.2.1.0²,⁷.0³,⁵]undec-10,11 - ylene-di[oxy(mono- and polyalkyleneoxy)alkanols] can be prepared by the reaction of one mol of tricyclo[5.2.1.0²,⁶]-dec-3-ene-9,10-diol with at least 4 mols of an olefin oxide, followed by epoxidation, in the manner explained supra. These novel epoxy alcohols have the following structural formula:

(III) 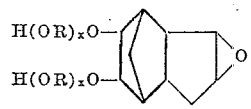

wherein $x$ and R have the values set forth in Formula II supra.

The 10-oxapentacyclo[6.3.1.1³,⁶.0²,⁷.0⁹,¹¹]tridec-4 - oxy (mono- and polyalkyleneoxy)alkanols are prepared by reacting one mol of tetracyclo[6.2.1.1³,⁶.0²,⁷]dodec-9-en-4-ol with at least 2 mols of an olefin oxide, followed by epoxidation, in the manner explained supra. These novel epoxy alcohols are characterized by the following structural formula:

(IV) 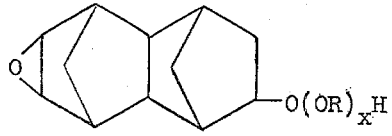

wherein $x$ and R have the values set forth in Formula II supra.

The 10 - oxapentacyclo[6.3.1.1³,⁶.0²,⁷.0⁹,¹¹]tridec - 4,5-ylene-di[oxy(mono- and polyalkoxy)alkanols] are prepared by the reaction of at least 4 mols of an olefin oxide per mol of tetracyclo[6.2.1.1³,⁶.0²,⁷]dodec-9-ene-4,5-diol, followed by epoxidation, in the manner explained supra. The resulting epoxy alcohols are thusly characterized:

(V) 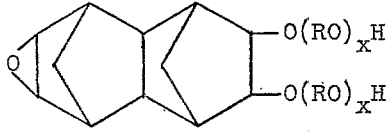

wherein $x$ and R have the values set forth in Formula II supra.

The 10-oxapentacyclo[6.3.1.1³,⁶.0²,⁷.0⁹,¹¹]tridec-4-ylalkyleneoxyalkanols can be prepared by the reaction of equimolar quantities of tetracyclo[6.2.1.1³,⁶.0²,⁷]dodec-9-en-4-ylalkanol and an olefin oxide, followed by epoxidation, in the manner explained supra. These novel epoxy alcohols have the following formula:

(VI) 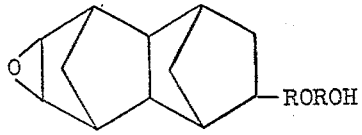

wherein each R can be the same or different divalent saturated aliphatic hydrocarbon radicals.

The 10-oxapentacyclo[6.3.1.1³,⁶.0²,⁷.0⁹,¹¹]tridec-4-ylalkyleneoxy(mono- and polyalkyleneoxy)alkanols can be prepared by the reaction of at least 2 mols of an olefin oxide per mol of tetracyclo[6.2.1.1³,⁶.0²,⁷]dodec-9-en-4-ylalkanol, then epoxidizing, in the manner explained supra. The following structural formula illustrates these novel epoxy alcohol monomers:

(VII) 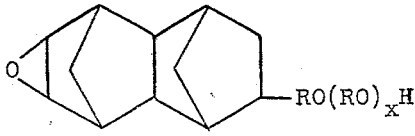

wherein each R, individually, is a divalent saturated aliphatic hydrocarbon radical, and wherein $x$ is a number having an average value of at least 2.

The 10 - oxapentacyclo[6.3.1.1³,⁶.0²,⁷.0⁹,¹¹]tridec - 4,5-ylene-di(alkyleneoxyalkanols) are obtained by reacting two mols of an olefin oxide per mol of tetracyclo[6.2.1.1³,⁶.0²,⁷]dodec-9-en - 4,5 - ylene - dialkanol, followed by epoxidation, in the manner explained supra. The following formula characterizes the novel epoxy alcohols under consideration:

(VIII) 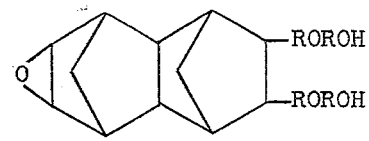

wherein each R can be the same or different divalent saturated aliphatic hydrocarbon radicals.

The 10 - oxapentacyclo[6.3.1.1³,⁶.0²,⁷.0⁹,¹¹]tridec - 4,5-xylene - di[alkyleneoxy(mono- and polyalkyleneoxy)alkanols] are prepared by the reaction of at least 4 mols of an olefin oxide per mol of tetracyclo[6.2.1.1³,⁶.0²,⁷] dodec-9-en-4,5-ylene-dialkanol, followed by epoxidation, in the manner explained supra. The following structural formula illustrates the novel epoxy alcohols under discussion:

(IX) 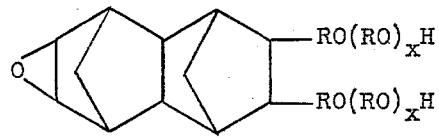

wherein each R, individually, is a divalent saturated aliphatic hydrocarbon radical, and wherein $x$ is a number having an average value of at least 2.

It is to be understood that the oxymethyleneoxy radical, i.e., —OCH₂O—, is not encompassed within the scope of the novel epoxy alcohol compounds of the invention.

The novel epoxy alcohol compounds of the invention can be prepared by the reaction of the corresponding olefinically unsaturated alcohol precursor with an epoxidizing agent. Among the epoxidizing agents contemplated include, for example, the aliphatic peracids, the cycloaliphatic peracids, the aromatic peracids, and the like. The organic hydrocarbon peracids are preferred. Illustrative peracids include, for instance, peracetic acid, perpropionic acid, perbutyric acid, perhexanoic acid, peroctanoic acid, perdodecanoic acid, perbenzoic acid, monoperphthalic acid, and the like. The lower aliphatic hydrocarbon peracids which contain from 2 to 4 carbon atoms are highly suitable. Peracetic acid is most preferred. It is highly desirable to employ the peracid as a solution in an inert normally liquid organic vehicle such as ethyl acetate, butyl acetate, acetone, and the like. A solution comprising from about 10 to 50 weight percent of peracid, based on the total weight of peracid and inert organic vehicle is suitable; from about 20 to 40 weight percent of peracid is preferred. The epoxidation reaction can be conducted at a temperature in the range of from about 0° C. and lower, to about 100° C., and higher, and preferably; from about 20° to about 80° C. Theoretically, to effect complete epoxidation of the olefinically unsaturated alcohol precursor, equimolar quantities of peracid and precursor should be employed. However, since some degradation of the peracid occurs during the epoxidation reaction, it is desirable to employ a quantity of peracid in excess of that theoretically required to effect essentially complete epoxidation of said precursor, e.g., from about 1.1 to about 10, and higher, mols of peracid per mol of precursor. The epoxidation reaction is conducted for a period of time sufficient to introduce oxirane oxygen at the site of the carbon to carbon double bond present in the precursor, e.g., from several minutes to several hours. Periodic analysis of samples of the reaction mixture to determine the quantity of peracid consumed during the epoxidation reaction can be readily performed by the operator by well established techniques and procedures. At the termination of the epoxidation reaction, any unreacted olefinic precursor, acid by-product, inert vehicle, if employed, and the like, can be recovered from the reaction product mixture, for example, by distillation under reduced pressure. Further well known purification techniques can be employed, as desired.

The novel epoxy alcohol compounds of the invention are a useful class of compounds. They can be employed as stabilizing and/or plasticizing agents for various synthetic condenstaion resins, e.g., poly(vinyl chloride), vinyl chloride/vinyl acetate copolymers, and the like. By incorporating into the resin from about 5 to 50 weight percent of the novel epoxy alcohol compound, a plasticized product can be obtained which exhibits desirable resilient and flexible characteristics. When the novel epoxy alcohol compounds are employed as stabilizing agents for chlorinated resins, e.g., poly(vinyl chloride), it is desirable to use from about 1.0 to 5.0, and higher, weight percent of said epoxy alcohol compound, based on the weight of the chlorinated resin. The resulting stabilized chlorinated resin exhibits improved heat and light stability.

The novel epoxy alcohol compounds, e.g., 4-oxatetracyclo[6.2.1.0$^{2,7}$.0$^{3,5}$]undecan-9-ol, are exceedingly effective as nematocides without harmful results to germinating plants such as bean, potato, tomato, radish, rye, millet, amaranthus, mustard, and other plants. This unusual characteristic is of particular use since solutions containing said epoxy alcohol compound can be sprayed on soil to selectively eliminate nematodes, e.g., root-knot nematode, etc., therefrom with negligible poisoning, if any, to the soil and germinating plants. Melon seeds imbedded in soil infested with root-knot nematode, *Meloidogyne incognita* var. *acrita*, after four weeks, exhibited severe galling of the rooting system of the maturing plant. However, melon seeds imbedded in the same infested soil, but treated with, for example, 4-oxatetracyclo[6.2.1.0$^{2,7}$.0$^{3,5}$]undecan-9-ol (150 pounds per acre), matured into melon plants exhibiting no galling whatsoever.

The following examples are illustrative.

Example 1

The compound, tricyclo[5.2.1.0$^{2,6}$]dec-3-en-8-oxyethanol, was prepared by the reaction of ethylene glycol with tricyclo[5.2.1.0$^{2,6}$]deca-3,8-diene in the presence of boron trifluoride catalyst. To 833 grams (4.29 mols) of tricyclo[5.2.1.0$^{2,6}$]dec-3-en-8-oxyethanol maintained at about 40° C., there was added, dropwise, over a period of 3 hours, with stirring, 1,340 grams of a 26.8 weight percent solution of peracetic acid in ethyl acetate. The reaction was exothermic and consequently, the reaction vessel was occasionally cooled with ice. The resulting admixture was maintained at about 40° C. for an additional 3 hours plus standing overnight at room temperature, i.e., about 24° C. for about 15 hours. Analysis of the reaction product mixture indicated that the theoretical amount of peracid had been consumed. Subsequently, the reaction product mixture was diulted with ethylbenzene, and the volatiles, e.g., ethyl acetate, acetic acid by-product, etc., were removed therefrom by distillation under reduced pressure. There was obtained (via fractional distillation) 869 grams of a colorless liquid, i.e., 4-oxatetracyclo[6.2.1.0$^{2,7}$.0$^{3,5}$]undec-9-oxyethanol, which had the following properties:

Boiling point—134–135° C./0.35 mm. of Hg
$n_D^{30}$—1.5095

| Elemental Analysis | Found (Percent) | Calculated (Percent) |
|---|---|---|
| Carbon | 68.44 | 68.54 |
| Hydrogen | 8.56 | 8.63 |

The yield was 96 percent.

Example 2

The compound, tricyclo[5.2.1.0$^{2,6}$]dec-3-en-8-ol, was prepared by the reaction of tricyclo[5.2.1.0$^{2,6}$]deca-3,8-diene in the presence of an aqueous solution of sulfuric acid under the influence of heat. To 150 grams (1 mol) of tricyclo[5.2.1.0$^{2,6}$]dec-3-en-8-ol maintained at about 45°–50° C., there was added, dropwise, over a period of 55 minutes, with stirring, 308 grams of a 27.2 weight percent solution of peracetic acid in ethyl acetate. The resulting admixture then was maintained at about 45°–50° C. for an additional 2.25 hours. Analysis of the reaction product mixture indicated that the theoretical amount of peracid had been consumed. Subsequently, the reaction product mixture was diluted with ethylbenzene, and the volatiles, e.g., ethyl acetate, acetic acid by-product, etc., were removed therefrom by distillation under reduced pressure. There was obtained (via fractional distillation) 164 grams of a colorless liquid, i.e., 4-oxatetracyclo[6.2.1.0$^{2,7}$.0$^{3,5}$]undecan-9-ol which had the following properties.

Boiling point—130–134° C./2.5 mm. of Hg
$n_D^{30}$—1.5205
Analysis for epoxide—96.9 percent

Example 3

The compound, tetracyclo[6.2.1.1$^{3,6}$.0$^{2,7}$]dodec-9-en-4-ol (melting point of 87°–88° C.), is prepared by the saponification of the reaction product obtained by the Diels-Alder synthesis of cyclopentadiene and vinyl acetate. To 176 grams of tetracyclo[6.2.1.1$^{3,6}$.0$^{2,7}$]dodec-9-en-4-ol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4-oxyethanol, is dried at an elevated temperature under reduced pressure.

Example 4

To a mixture of 200 grams of tetracyclo[6.2.1.1$^{3,6}$.0$^{2,7}$]dodec-9-en-4-oxyethanol and 100 grams of ethyl acetate, there is added under stirring, dropwise, 278 grams of a 27.4 weight percent solution of peracetic acid in ethyl acetate. The reaction is exothermic and consequently, the reaction temperature is controlled at about 45° C. by the rate of addition. After 2.5 hours at this temperature, the reaction is essentially complete. The volatiles, acetic acid by-product, ethyl acetate, etc., are removed by co-distillation with ethylbenzene under reduced pressure. After stripping under high vacuum at about 100° C., there is obtained a yellow, viscous liquid product, i.e., 10-oxapentacyclo[6.3.1.1$^{3,6}$.0$^{2,7}$.0$^{9,11}$]tridec-4-oxyethanol. The infrared spectrum discloses the presence of epoxide and hydroxyl groups.

Example 5

The compound, tetracyclo[6.2.1.1$^{3,6}$.0$^{2,7}$]dodec-9-en-4-ylmethanol (boiling point of 100° C. at 0.5 mm. of Hg, and $n_D^{30}$ of 1.5362), is prepared via the Diels-Alder synthesis of cyclopentadiene and allyl alcohol. To 190 grams of tetracyclo[6.2.1.1$^{3,6}$.0$^{2,7}$]dodec-9-en-4-ylmethanol, there is added 0.2 gram of potassium hydroxide, followed by heating the resulting admixtures to about 115°–130° C. with stirring. Ethylene oxide is fed into the stirred reaction mixture through a diffuser (below the liquid level) until the weight thereof increases by 43 grams. Then the resulting reaction product mixture is cooled, washed twice with ice water, and dried by heating to about 110° C. under a reduced pressure of 2 mm. of Hg. The resulting product, i.e., tetracyclo[6.2.1.1$^{3,6}$.0$^{2,7}$]dodec-9-en-4 - ylmethyleneoxyethanol, is employed in Example 6 to follow.

*Example 6*

To a mixture of 210 grams of tetracyclo[6.2.1.1$^{3,6}$.0$^{2,7}$] dodec-9-en-4-ylmethyleneoxyethanol and 100 grams of ethyl acetate, there is added under stirring, dropwise, 330 grams of a 23 weight percent solution of peracetic acid in ethyl acetate. The reaction is exothermic and consequently, the reaction temperature is controlled to about 40°–50° C. by the rate of addition during the initial stage, and by mild heating in the latter stage. After 3 hours at this temperature, the reaction is essentially complete. The volatiles, acetic acid by-product, ethyl acetate, etc., are removed by co-distillation with ethyl benzene under reduced pressure. After stripping under high vacuum at about 110° C., there is obtained a yellow, viscous liquid product. The product, 10-oxapentacyclo[6.3.1.1$^{3,6}$.0$^{2,7}$.0$^{9,11}$]tridec-4-ylmethyleneoxyethanol, is identified by its infrared spectrum.

*Example 7*

A. Tricyclo[5.2.1.0$^{2,6}$]dec-3-ene - 9,10 - diol (melting point of 90° C.) is prepared by the saponification of the reaction product of dicyclopentadiene and lead tetra-acetate. To a reaction vessel which contains 42 grams of the above said diol admixture and 42 grams of ethyl acetate maintained with stirring at about 30° C., there is added dropwise, over a period of one hour 76 grams of a 26.5 weight percent solution of peracetic acid in ethyl acetate. The resulting solution is maintained at 30° C. for an additional 5 hours. The reaction is essentially complete as indicated by titration for peracetic acid. The volatile materials, i.e., ethyl acetate, acetic acid by-product, etc., are removed by co-distillation with ethylbenzene. The residue product, thus obtained, solidifies on standing and comprises a mixture of 4-oxatetracyclo[6.2.1.0$^{2,7}$.0$^{3,5}$]undecane-10,11-diol.

B. In an analogous manner as above, tricyclo[5.2.1.0$^{2,6}$] undec-3-ene-8,9-diol (which is prepared by the reaction of equimolar quantities of dicyclopentadiene and hydrogen peroxide in the presence of osmium tetroxide) is reacted with a solution of peracetic acid in ethyl acetate, to yield 4-oxatetracyclo[6.2.1.0$^{2,7}$.0$^{3,5}$]undecane-9,10-diol.

*Example 8*

To a reaction vessel which contains 45 grams of ethyl acetate and 44 grams of tetracyclo[6.2.1.1$^{3,6}$.0$^{2,7}$]dodec-9-en-4,5-ylene-dimethanol (a while solid which is isolated from high boiling fractions, i.e., 140°–180° C./0.5 mm. of Hg, resulting from the Diels-Alder synthesis of cyclopentadiene and 2-butene-1,4-diol), maintained at about 30° C. with stirring, there is added, dropwise, over a period of one hour 42 grams of a 26 weight percent solution of peracetic acid in ethyl acetate. The resulting solution is maintained at 30° C. for an additional 5.5 hours to ensure completion of the reaction. The volatile materials, i.e., ethyl acetate, acetic acid by-product, etc., are removed by co-distillation with ethylbenzene. The residue product, thus obtained, solidifies on standing and is identified as 10-oxapentacyclo[6.3.1.1$^{3,6}$.0$^{2,7}$.0$^{9,11}$]tridec-4,5 - ylene - dimethanol by its infrared absorption spectrum.

*Example 9*

To a reaction vessel which contains 40 grams of ethyl acetate and 40 grams of tetracyclo[6.2.1.1$^{3,6}$.0$^{2,7}$]dodec- 9-ene-4,5-diol (which is prepared by the reaction of equimolar quantities of tetracyclo[6.2.1.1$^{3,6}$.0$^{2,7}$]dodeca-4,9-diene and hydrogen peroxide in the presence of osmium tetroxide) maintained at about 30° C. with stirring, there is added, dropwise, over a period of 1.5 hours 42 grams of a 26 weight percent solution of peracetic acid in ethyl acetate. The resulting solution is maintained at 30° C. for an additional 6 hours. At the end of this period of time the reaction is essentially complete as indicated by titration for peracetic acid. The volatile materials, i.e., ethyl acetate, acetic acid by-product, etc., are removed by co-distillation with ethylbenzene. The solid residue product, thus obtained, is identified as 10-oxapentacyclo[6.3.1.1$^{3,6}$ .0$^{2,7}$.0$^{9,11}$]tridecane-4,5 - diol by its infrared absorption spectrum.

*Example 10*

To 62 grams of tetracyclo[6.2.1.1$^{3,6}$.0$^{2,7}$]dodec-9-en-4-ol (melting point of 87°–88° C.; prepared by the saponification of the reaction product obtained by the Diels-Alder synthesis of cyclopentadiene and vinyl acetate) and 24 grams of ethyl acetate, maintained at about 50°–55° C., there was added to the resulting solution, dropwise, 120 grams of a 28.6 weight percent solution of peracetic acid in ethyl acetate over a period of 35 minutes. After an additional 2 hours at about 50°–55° C., the amount of peracetic acid consumed was 97.7% of the theoretical. The volatiles were removed from the reaction product mixture by co-distillation with ethylbenzene. There was obtained 77 grams of a viscous liquid product identified as 10-oxapentacyclo[6.3.1.1$^{3,6}$.0$^{2,7}$.0$^{9,11}$]tridecan-4-ol.

*Example 11*

To 150 grams of tetracyclo[6.2.1.1$^{3,6}$.0$^{2,7}$]dodec-9-en-4-ylmethanol (boiling point of 100° C./0.5 mm. of Hg and $n_D^{30}$ of 1.5362; prepared by the Diels-Alder synthesis of cyclopentadiene and allyl alcohol) which was maintained with stirring at about 50°–55° C., there was added, dropwise, 232 grams of a 28.6 weight percent solution of peracetic acid in ethyl acetate over a period of 70 minutes. After an additional one hour at about 50°–55° C., the amount of peracetic acid consumed was 98.5 percent of the theoretical. The volatiles were removed from the reaction product mixture by co-distillation with ethylbenzene. There was obtained 177 grams of a viscous product containing 10 - oxapentacyclo[6.3.1.1$^{3,6}$.0$^{2,7}$.0$^{9,11}$] tridec-4-ylmethanol.

*Example 12*

To a reaction vessel which contains 112 grams of tricyclo[5.2.1.0$^{2,6}$]dec-3-en-8-oxypropanediol (boiling point of 175°–180° C. and $n_D^{25}$ of 1.5186; prepared by the boron trifluoride-catalyzed addition of glycerol to dicyclopentadiene under the influence of heat, maintained at about 30° C. with stirring, there is added, dropwise, 168 grams of a 25 weight percent solution of peracetic acid in ethyl acetate over a period of about 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo[6.2.1.0$^{2,7}$.0$^{3,5}$]undec-9-oxypropanediol (or glycerol mono-4-oxatetracyclo[6.2.1.0$^{2,7}$.0$^{3,5}$]undec - 9-enyl ether) by inspection of its infrared absorption spectrum.

*Example 13*

To a reaction vessel which contains 800 grams of tricyclo[5.2.1.0$^{2,6}$]dec-3-en-8-oxy-n-butanol (which results from the boron trifluoride catalyzed addition of 1,4-butanediol to tricyclo[5.2.1.0$^{2,6}$]deca-3,8-diene under the influence of heat), maintained at about 30° C. with stirring, there is added, dropwise, 1550 grams of a 26.2 weight percent solution of peracetic acid in ethyl acetate over a period of 4 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo[6.2.1.0$^{2,6}$.0$^{3,5}$]undec-9-oxy-n-butanol by inspection of its infrared absorption spectrum.

*Example 14*

To a reaction vessel which contains 100 grams of ethyl acetate and 125 grams pentaerythritol mono - tricyclo-[5.2.1.0$^{2,6}$]dec-3-en-8-yl ether (which results from the boron trifluoride-catalyzed addition of pentaerythritol to tricyclo[5.2.1.0$^{2,6}$]deca-3,8-diene under the influence of heat), maintained at about 30° C. with stirring, there is added, dropwise, 168 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as pentaerythritol mono - 4 - oxatetracyclo [6.2.1.0$^{2,7}$.0$^{3,5}$]undec-9-yl ether by inspection of its infrared absorption spectrum and analysis for the epoxide group.

*Example 15*

To a reaction vessel which contains 76 grams of hexanetriol mono-tetracyclo[6.2.1.1$^{3,6}$.0$^{2,7}$]dodec - 9 - en - 4-yl ether (which results from the boron trifluoride catalyzed addition of 1,2,6-hexanetriol to

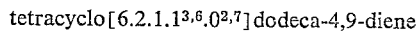
tetracyclo[6.2.1.1$^{3,6}$.0$^{2,7}$]dodeca-4,9-diene under the influence of heat), maintained at about 30° C. with stirring, there is added, dropwise, 84 grams of a 25 weight percent solution of peracetic acid in ethyl acetate over a period of 1.5 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as hexanetriol mono-10-oxapentacyclo[6.3.1.1$^{3,6}$.0$^{2,7}$.0$^{9,11}$]tridec-4-yl ether by inspection of its infrared absorption spectrum.

*Example 16*

To a reaction vessel which contains 120 grams of glycerol mono - tetracyclo[6.2.1.1$^{3,6}$.0$^{2,7}$]dodec-9-en - 4-yl ether (which results from the boron trifluoride catalyzed addition of glycerol to tetracyclo[6.2.1.1$^{3,6}$.0$^{2,7}$]dodeca-4,9-diene under the influence of heat), maintained at about 30° C. with stirring, there is added, dropwise, 165 grams of a 25.5 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as glycerol mono-10-oxapentacyclo[6.3.1.1$^{3,6}$.0$^{2,7}$.0$^{9,11}$]tridec - 4 - yl ether by inspection of its infrared absorption spectrum.

*Example 17*

A. To a reaction vessel which contains 66 grams of glycerol mono - tetracyclo[6.2.1.1$^{3,6}$.0$^{2,7}$]dodec - 9 - en-4-ylmethyl ether (which results from the Diels-Alder synthesis of 2 mols of cyclopentadiene with one mol of glycerol monoallyl ether), maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as glycerol mono-10-oxapentacyclo[6.3.1.1$^{3,6}$.0$^{2,7}$.0$^{9,11}$]tridec - 4 - ylmethyl ether by inspection of its infrared absorption spectrum.

B. In an analogous manner as above, pentaerythritol mono - tetracyclo[6.2.1.1$^{3,6}$.0$^{2,7}$]dodec - 9 - en - 4 - ylmethyl ether (prepared from the Diels-Alder synthesis of 2 mols of cyclopentadiene with one mol of pentaerythritol monoallyl ether) is reacted with a solution of peracetic acid in ethyl acetate to give a viscous liquid product which is identified as pentaerythritol mono-10-oxapentacyclo-[6.3.1.1$^{3,6}$.0$^{2,7}$.0$^{9,11}$]tridec-4-ylmethyl ether by its infrared absorption spectrum.

*Example 18*

To a reaction vessel which contains 140 grams of tetracyclo[6.2.1.1$^{3,6}$.0$^{2,7}$]dodec-9-en-4-ylethanol (which results from the Diels-Alder synthesis of 2 mols of cyclopentadiene and one mol of 1-buten-4-ol), maintained at about 50° C. with stirring, there is added, dropwise, 260 grams of a 25.5 weight percent solution of peracetic acid in ethyl acetate over a period of 2 hours. After an additional 6 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1. 1$^{3,6}$.0$^{2,7}$.0$^{9,11}$]tridec-4-ylethanol by inspection of its infrared absorption spectrum.

*Example 19*

The compound, tetracyclo[6.2.1.1$^{3,6}$.0$^{2,7}$]dodec-9-en-4-ol (melting point of 87°–88° C.), is prepared by the saponification of the reaction product obtained by the Diels-Alder synthesis of 2 mols of cyclopentadiene with one mol of vinyl acetate. To 88 grams of tetracyclo[6.2. 1.1$^{3,6}$.0$^{2,7}$]dodec-9-en-4-ol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 176 grams. Then the resulting reaction product mixture is cooled, followed by neutralizing the catalyst with acetic acid. The reaction product mixture is washed with aqueous solution of sodium chloride, and then washed with water. The product, a mixture of tetracyclo[6.2.1.1$^{3,6}$. 0$^{2,7}$]dodec-9-en-4-oxy(polyethyleneoxy)ethanols, is dried at an elevated temperature under reduced pressure.

*Example 20*

To a reaction vessel which contains 200 grams of ethyl acetate and 200 grams of the mixture of tetracyclo[6.2.1. 1$^{3,6}$.0$^{2,7}$]dodec - 9 - en - 4 - oxy(polyethyleneoxy)ethanols which is prepared as explained in Example 19 supra and maintained at about 30° C. with stirring, there is added, dropwise, 350 grams of a 26.2 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained is identified as a mixture of 10-oxapentacyclo[6.3.1.1$^{3,6}$.0$^{2,7}$.0$^{9,11}$]tridec-4-oxy-(polyethyleneoxy)ethanols.

*Example 21*

To a reaction vessel which contains 160 grams of tricyclo[5.2.1.0$^{2,6}$]dec-3-en-8-ol, there is added 0.2 gram of potassium hydroxide, followed by heating the resulting admixture to about 120° C. with stirring. Ethylene oxide is fed into the stirred reaction mixture (below the liquid level) until the weight thereof increases by 240 grams. Then the resulting reaction product mixture is cooled, followed by neutralizing the catalyst with acetic acid. The reaction product mixture is washed with aqueous solution of sodium chloride, and then washed with water. The product, a mixture of tricyclo[5.2.1.0$^{2,6}$]dec-3-en-8-oxy-(polyethyleneoxy)ethanols, is dried at an elevated temperature under reduced pressure.

*Example 22*

To a reaction vessel which contains 250 grams of ethyl acetate and 300 grams of the mixture of tricyclo[5.2.1.0$^{2,6}$]dec-3-en-oxy(polyethyleneoxy)ethanols which is prepared as explained in Example 21 supra and maintained at about 40° C. with stirring, there is added, dropwise, 600 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product thus obtained is identified as a mixture of 4 - oxatetracyclo[6.2.1.0$^{2,7}$.0$^{3,5}$]undec - 9 - oxy-(polyethyleneoxy)ethanols by inspection of its infrared absorption spectrum.

*Example 23*

To a reaction vessel which contains 80 grams of tricyclo[5.2.1.0$^{2,6}$]dec-3-ene-8,9-diol, there is added 0.3 gram of potassium hydroxide, followed by heating the resulting admixture to about 120° C. with stirring. Ethylene oxide is fed into the stirred reaction mixture (below the liquid level) until the weight thereof increases by 330 grams. Then the resulting reaction product mixture is cooled, followed by neutralizing the catalyst with acetic acid. The reaction product mixture is washed twice with aqueous solution of sodium chloride, and then washed with water. The product, a mixture of tricyclo[5.2.1.0$^{2,6}$]dec-3-en-8,9-ylene-di[oxy(polyethyleneoxy)ethanols], is dried at an elevated temperature under reduced pressure.

*Example 24*

To a reaction vessel which contains 110 grams of ethyl acetate and 110 grams of the mixture of tricyclo[5.2.1.0$^{2,6}$]dec-3-en - 8,9 - ylene-di[oxy(polyethyleneoxy)ethanols] which is prepared as explained in Example 23 supra and maintained at about 40° C. with stirring, there is added, dropwise, 400 grams of a 26.2 weight percent solution of peracetic acid in ethyl acetate over a period of 2.5 hours. After an additional 6 hours at about 40° C., the reaction is essentially complete as indicated by a titration for peracetic acid. The volatile materials, i.e., ethyl acetate, acetic acid by-product, etc., are removed from the reaction product mixture by co-distillation with ethylbenzene. The very viscous liquid product, thus obtained, is identified as a mixture of 4-oxatetracyclo[6.2.1.0$^{2,6}$.0$^{3,5}$]undec-9,10-ylene-di[oxy(polyethyleneoxy)ethanols] by inspection of its infrared absorption spectrum.

*Example 25*

To a reaction vessel which contains 50 grams of tetracyclo[6.2.1.1$^{3,6}$.0$^{2,7}$]dodec-9-ene-4,5-diol, there is added 0.2 gram of potassium hydroxide, followed by heating the resulting admixture to about 100°–120° C. with stirring. Ethylene oxide is fed into the stirred reaction mixture (below the liquid level) until the weight thereof increases by 280 grams. Then the resulting reaction product mixture is cooled, followed by neutralizing the catalyst with acetic acid. The reaction product mixture is washed twice with aqueous solution of sodium chloride, and then washed with water. The product, a mixture of tetracyclo[6.2.1.1$^{3,6}$.0$^{2,7}$]dodec-9-en-4,5-ylene-di[oxy(polyethyleneoxy)ethanols], is dried at an elevated temperature under reduced pressure.

*Example 26*

To a reaction vessel which contains 80 grams of ethyl acetate and 80 grams of the mixture of tetracyclo[6.2.1.1$^{3,6}$.0$^{2,7}$]dodec-9-en - 4,5 - ylene - di[oxy(polyethyleneoxy)ethanols] which is prepared as explained in Example 25 as supra and maintained at about 45° C. with stirring, there is added, dropwise, 300 grams of a 26.7 weight percent solution of peracetic acid in ethyl acetate over a period of 2 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as a mixture of 10-oxapentacyclo[6.3.1.1$^{3,6}$.0$^{2,7}$.0$^{9,11}$]tridec-4,5 - ylene - di[oxy(polyethyleneoxy)ethanols] by inspection of its infrared absorption spectrum.

*Example 27*

To 110 grams of the compound, tetracyclo[6.2.1.1$^{3,6}$.0$^{2,7}$]dodec-9-en-4,5-ylene-dimethanol (prepared via the Diels-Alder synthesis of 2 mols of cyclopentadiene with one mol of 2-butene-1,4-diol), there is added 0.2 gram of potassium hydroxide, followed by heating the resulting admixture to about 100°–120° C. with stirring. Ethylene oxide is fed into the stirred reaction mixture (below the liquid level) until the weight thereof increases by 44 grams. Then the resulting reaction product mixture is cooled, followed by neutralizing the catalyst with acetic acid. The reaction product mixture is washed twice with aqueous solution of sodium chloride, and then washed with water. The product, tetracyclo[6.2.1.1$^{3,6}$.0$^{2,7}$]dodec-9-en-4,5-ylene-di(methyleneoxyethanol), is dried at an elevated temperature under reduced pressure.

*Example 28*

To a reaction vessel which contains 70 grams of tetracyclo[6.2.1.1$^{3,6}$.0$^{2,7}$]dodec-9-en-4,5-ylene - di(methyleneoxyethanol) maintained at about 30° C. with stirring, there is added, dropwise, 300 grams of a 25.6 weight percent solution of peracetic acid in ethyl acetate over a period of 3 hours. After an additional 4 hours at about 45° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4,5-ylene-di(methyleneoxyethanol) by inspection of its infrared absorption spectrum.

*Example 29*

To a reaction vessel which contains 80 grams of tricyclo[5.2.1.0$^{2,6}$]dec-3-en-8,9 - ylene - di(oxyethanol) prepared by heating 0.5 mol of tricyclo[5.2.1.0$^{2,6}$]dec-3-ene-8,9-diol with one mol of ethylene oxide in the presence of potassium hydroxide catalyst maintained at about 30° C. with stirring, there is added, dropwise, 150 grams of a 25 weight percent solution of peracetic acid in ethyl acetate over a period of 1.5 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 4-oxatetracyclo[6.2.1.0$^{2,7}$.0$^{3,5}$]undec-9,10-ylene-di-(oxyethanol) by inspection of its infrared absorption spectrum.

*Example 30*

A. To a reaction vessel which contains 60 grams of tricyclo[5.2.1.0$^{2,6}$]dec-3-en-9,10 - ylene - di(oxyethanol), which results from the reaction of tricyclo[5.2.1.0$^{2,6}$]dec-3-ene-9,10-diol with two mols of ethylene oxide under the influence of heat and potassium hydroxide, maintained at about 30° C. with stirring, there is added, dropwise, 80 grams of a 24.8 weight percent solution of peracetic acid in ethyl acetate over a period of 2 hours. After an addition 5 hours at about 30° C., the reaction is essentially complete as indicated by a titration for peracetic acid. The volatile materials, i.e., ethyl acetate, acetic acid by-product, etc. are removed from the reaction product mixture by co-distillation with ethylbenzene. The viscous liquid product, thus obtained, is identified as 4-oxatetracyclo[6.2.1.0$^{2,7}$.0$^{3,5}$]undec-10,11-ylene-di(oxyethanol) by inspection of its infrared absorption spectrum.

*Example 31*

A. To a reaction vessel which contains 70 grams of tetracyclo[6.2.1.1$^{3,6}$.0$^{2,7}$]dodec-9-en-4,5-ylene-di(oxyethanol), which results from the potassium hydroxide-catalyzed reaction of two mols of ethylene oxide with tetracyclo[6.2.1.1$^{3,6}$.0$^{2,7}$]dodec-9-ene-4,5-diol under the influence of heat, maintained at about 30° C. with stirring, there is added, dropwise, 80 grams of a 24.8 weight percent solution of peracetic acid in ethyl acetate over a period of 2 hours. After an additional 6 hours at about 30° C., the reaction is essentially complete as indicated by a titration for peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]tridec-4,5-ylene-di(oxyethanol) by inspection of its infrared absorption spectrum.

*Example 32*

To a reaction vessel which contains 50 grams of tetracyclo[6.2.1.1$^{3,6}$.0$^{2,7}$]dodec-9-en-4,5-ylene-di(methyleneoxyethanol) maintained at about 30° C. with stirring, (prepared by heating 0.5 mol of tetracyclo[6.2.1.1$^{3,6}$.0$^{2,7}$]dodec-9-en-4,5-ylene-dimethanol with one mol of ethylene oxide in the presence of potassium hydroxide catalyst) there is added, dropwise, 140 grams of a 25.2 weight percent solution of peracetic acid in ethyl acetate over a period of 2 hours. After an additional 4 hours at about 30° C., the reaction is essentially complete as indicated by a titration of peracetic acid. The volatile materials, i.e., ethyl acetate, acetic acid by-product, etc., are removed from the reaction product mixture by co-distillation with ethylbenzene. The viscous liquid product, thus obtained, is identified as 10-oxapentacyclo[6.3.1.1$^{3,6}$.0$^{2,7}$.0$^{9,11}$]
    tridec-4,5-ylene-di(methyleneoxyethanol)

by inspection of its infrared absorption spectrum.

Reasonable variations and modifications of the invention can be made or carried out in the light of the above disclosure without departing from the spirit and scope thereof.

What is claimed is:
1. A composition selected from the group consisting of
  (a) 4-oxatetracyclo[6.2.1.0$^{2,7}$.0$^{3,5}$]undecan-9-ol,
  (b) 4-oxatetracyclo[6.2.1.0$^{2,7}$.0$^{3,5}$]undec-9-oxyalkanol,
  (c) 4-oxatetracyclo[6.2.1.0$^{2,7}$.0$^{3,5}$]undec-9-oxyalkane-poly-ol,
  (d) 4-oxatetracyclo[6.2.1.0$^{2,7}$.0$^{3,5}$]undecane-9,10-diol,
  (e) 4-oxatetracyclo[6.2.1.0$^{2,7}$.0$^{3,5}$]undecane-10,11-diol,
  (f) 10-oxapentacyclo[6.3.1.1$^{3,6}$.0$^{2,7}$.0$^{9,11}$]tridecan-4-ol,
  (g) 10-oxapentacyclo[6.3.1.1$^{3,6}$.0$^{2,7}$.0$^{9,11}$]tridecane-4,5-diol,
  (h) 10-oxapentacyclo[6.3.1.1$^{3,6}$.0$^{2,7}$.0$^{9,11}$]tridec-4-ylalkanol,
  (i) 10-oxapentacyclo[6.3.1.1$^{3,6}$.0$^{2,7}$.0$^{9,11}$]tridec-4,5-ylenedialkanol,
  (j) 10-oxapentacyclo[6.3.1.1$^{3,6}$.0$^{2,7}$.0$^{9,11}$]tridec-4-oxyalkanol,
  (k) 10-oxapentacyclo[6.3.1.1$^{3,6}$.0$^{2,7}$.0$^{9,11}$]tridec-4-oxyalkane-poly-ol,
  (l) 10-oxapentacyclo[6.3.1.1$^{3,6}$.0$^{2,7}$.0$^{9,11}$]tridec-4-ylmethyleneoxyalkanol,
  (m) 10-oxapentacyclo[6.3.1.1$^{3,6}$.0$^{2,7}$.0$^{9,11}$]tridec-4-ylmethyleneoxyalkane-poly-ol,
  (n) the 4-oxatetracyclo[6.2.1.0$^{2,7}$.0$^{3,5}$]undec-9-oxy(mono- and polyalkyleneoxy)alkanols, which result from the monoepoxidation of the reaction products of tricyclo[5.2.1.0$^{2,6}$]dec-3-en-8-ol with a saturated aliphatic mono vicinal-epoxyhydrocarbon,
  (o) the 4-oxatetracyclo[6.2.1.0$^{2,7}$.0$^{3,5}$]undec-9,10-ylenedi[oxy(mono- and polyalkyleneoxy)alkanols] which result from the monoepoxidation of the reaction products of tricyclo[5.2.1.0$^{2,6}$]dec-3-ene-8,9-diol with a saturated aliphatic mono vicinal-epoxyhydrocarbon,
  (p) the 4-oxatetracyclo[6.2.1.0$^{2,7}$.0$^{3,5}$]undec-10,11-ylenedi[oxy(mono- and polyalkyleneoxy)alkanols] which result from the monoepoxidation of the reaction products of tricyclo[5.2.1.0$^{2,6}$]dec-3-ene-9,10-diol with a saturated aliphatic mono vicinal-epoxyhydrocarbon,
  (q) the 10-oxapentacyclo[6.3.1.1$^{3,6}$.0$^{2,7}$.0$^{9,11}$]tridec-4-oxy(mono- and polyalkyleneoxy)alkanols which result from the monoepoxidation of the reaction products of tetracyclo[5.2.1.0$^{2,6}$]dodec-9-en-4-ol with a saturated aliphatic mono vicinal-epoxyhydrocarbon,
  (r) the 10-oxapentacyclo[6.3.1.1$^{3,6}$.0$^{2,7}$.0$^{9,11}$]tridec-4,5-ylene-di[oxy(mono- and polyalkyleneoxy)alkanols] which result from the monoepoxidation of the reaction products of tetracyclo[6.2.1.1$^{3,6}$.0$^{2,7}$]dodec-9-ene-4,5-diol with a saturated aliphatic mono vicinal-epoxyhydrocarbon,
  (s) the 10-oxapentacyclo[6.3.1.1$^{3,6}$.0$^{2,7}$.0$^{9,11}$]tridec-4-ylmethyleneoxy(mono- and polyalkyleneoxy)alkanols which result from the monoepoxidation of the reaction products of tetracyclo[6.2.1.1$^{3,6}$.0$^{2,7}$]dodec-9-en-4-ylmethanol with a saturated aliphatic mono vicinal-epoxyhydrocarbon,
  (t) 10-oxapentacyclo[6.3.1.1$^{3,6}$.0$^{2,7}$.0$^{9,11}$]tridec-4,5-ylenedi(alkyleneoxyalkanol), and
  (u) the 10-oxapentacyclo[6.3.1.1$^{3,6}$.0$^{2,7}$.0$^{9,11}$]tridec-4,5-ylene-di[alkyleneoxy(mono- and polyalkyleneoxy)alkanols] which result from the monoepoxidation of the reaction products of tetracyclo[6.2.1.1$^{3,6}$.0$^{2,7}$]dodec-9-en-4,5-ylene-dialkanol with a saturated aliphatic mono vicinal-epoxyhydrocarbon.

2. 4-oxatetracyclo[6.2.1.0$^{2,7}$.0$^{3,5}$]undecan-9-ol.
3. 4-oxatetracyclo[6.2.1.0$^{2,7}$.0$^{3,5}$]undec-9-oxyalkanol.
4. 4-oxatetracyclo[6.2.1.0$^{2,7}$.0$^{3,5}$]undec-9-oxyalkane-poly-ol.
5. 4-oxatetracyclo[6.2.1.0$^{2,7}$.0$^{3,5}$]undecane-9,10-diol.
6. 4-oxatetracyclo[6.2.1.0$^{2,7}$.0$^{3,5}$]undecane-10,11-diol.
7. 10-oxapentacyclo[6.3.1.1$^{3,6}$.0$^{2,7}$.0$^{9,11}$]tridecan-4-ol.
8. 10-oxapentacyclo[6.3.1.1$^{3,6}$.0$^{2,7}$.0$^{9,11}$]tridecane-4,5-diol.
9. 10-oxapentacyclo[6.3.1.1$^{3,6}$.0$^{2,7}$.0$^{9,11}$]tridec-4-ylalkanol.
10. 10-oxapentacyclo[6.3.1.1$^{3,6}$.0$^{2,7}$.0$^{9,11}$]tridec-4,5-ylene-dialkanol.
11. 10-oxapentacyclo[6.3.1.1$^{3,6}$.0$^{2,7}$.0$^{9,11}$]tridec-4-oxyalkanol.
12. 10-oxapentacyclo[6.3.1.1$^{3,6}$.0$^{2,7}$.0$^{9,11}$]tridec-4-oxyalkane-poly-ol.
13. 10-oxapentacyclo[6.3.1.1$^{3,6}$.0$^{2,7}$.0$^{9,11}$]tridec-4-ylmethyleneoxyalkanol.
14. 10-oxapentacyclo[6.3.1.1$^{3,6}$.0$^{2,7}$.0$^{9,11}$]tridec-4-ylmethyleneoxyalkane-poly-ol.
15. The 4-oxatetracyclo[6.2.1.0$^{2,7}$.0$^{3,5}$]undec-9-oxy(mono- and polyalkyleneoxy)alkanols, which result from the monoepoxidation of the reaction products of tricyclo[5.2.1.0$^{2,6}$]dec-3-en-8-ol with a saturated aliphatic mono vicinal-epoxyhydrocarbon.

16. The 4 - oxatetracyclo[6.2.1.0²,⁷.0³,⁵]undec - 9,10 - ylene - di[oxy(mono- and polyalkyleneoxy)alkanols] which result from the monoepoxidation of the reaction products of tricyclo[5.2.1.0²,⁶]dec-3-ene-8,9-diol with a saturated aliphatic mono vicinal-epoxyhydrocarbon.

17. The 4 - oxatetracyclo[6.2.1.0²,⁷.0³,⁵]undec - 10,11-ylene - di[oxy(mono- and polyalkyleneoxy)alkanols] which result from the monoepoxidation of the reaction products of tricyclo[5.2.1.0²,⁶]dec-3-ene-9,10-diol with a saturated aliphatic mono vicinal-epoxyhydrocarbon.

18. The 10 - oxapentacyclo[6.3.1.1³,⁶.0²,⁷.0⁹,¹¹]tridec-4-oxy(mono- and polyalkyleneoxy)alkanols which result from the monoepoxidation of the reaction products of tetracyclo[5.2.1.0²,⁶]dodec-9-en-4-ol with a saturated aliphatic mono vicinal-epoxyhydrocarbon.

19. The 10 - oxapentacyclo[6.3.1.1³,⁶.0²,⁷.0⁹,¹¹]tridec-4,5 - ylene - di[oxy(mono- and polyalkyleneoxy)alkanols] which result from the monoepoxidation of the reaction products of tetracyclo[6.2.1.1³,⁶.0²,⁷]dodec-9-ene-4,5-diol with a saturated aliphatic mono vicinal-epoxyhydrocarbon.

20. 10-oxapentacyclo[6.3.1.1³,⁶.0²,⁷.0⁹,¹¹]tridec - 4 - ylmethyleneoxyalkanol.

21. The 10 - oxapentacyclo[6.3.1.1³,⁶.0²,⁷.0⁹,¹¹]tridec - 4 - ylmethyleneoxy(mono- and polyalkyleneoxy)alkanols which result from the monoepoxidation of the reaction products of tetracyclo[6.2.1.1³,⁶.0²,⁷]dodec-9-en-4-ylmethanol with a saturated aliphatic mono vicinal-epoxyhydrocarbon.

22. 10 - oxapentacyclo[6.3.1.1³,⁶.0²,⁷.0⁹,¹¹]tridec - 4,5-ylene-di(alkyleneoxyalkanol).

23. The 10 - oxapentacyclo]6.3.1.1³,⁶.0²,⁷.0⁹,¹¹]tridec-4,5 - ylene - di[alkyleneoxy(mono- and polyalkyleneoxy)alkanols] which result from the monoepoxidation of the reaction products of tetracyclo[6.2.1.1³,⁶.0²,⁷]dodec-9-en-4,5-ylene-dialkanol with a saturated aliphatic mono vicinal-epoxyhydrocarbon.

24. 10 - oxapentacyclo[6.3.1.1³,⁶.0²,⁷.0⁹,¹¹]tridec - 4,5-ylene-dimethanol.

25. 10 - oxapentacyclo[6.3.1.1³,⁶.0²,⁷.0⁹,¹¹]tridec - 4 - ylmethyleneoxyethanol.

26. 4 - oxatetracyclo[6.2.1.0²,⁷.0³,⁵]undec - 9 - oxypropanediol.

27. 10 - oxapentacyclo[6.3.1.1³,⁶.0²,⁷.0⁹,¹¹]tridec - 4 - ylmethanol.

28. 10 - oxapentacyclo[6.3.1.1³,⁶.0²,⁷.0⁹,¹¹]tridec - 4 - ylethyleneoxyethanol.

29. 10 - oxapentacyclo[6.3.1.1³,⁶.0²,⁷.0⁹,¹¹]tridec - 4,5-ylene-di(methyleneoxyethanol).

30. Epoxydicyclopentyloxyethanol of the formula

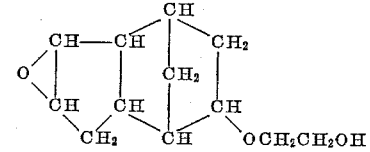

31. A compound of the formula

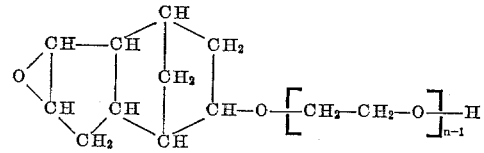

wherein $n$ is an integer having a value of 1 to 2.

References Cited by the Examiner

UNITED STATES PATENTS

| | | | |
|---|---|---|---|
| 2,385,788 | 10/1945 | Bruson | 260—617 |
| 2,393,609 | 1/1946 | Bruson | 260—611 |
| 2,543,419 | 2/1951 | Niederhauser | 260—348 |
| 2,927,934 | 3/1960 | Greenspan et al. | 260—348 |
| 2,962,453 | 11/1960 | Phillips et al. | 260—348 |
| 3,007,958 | 11/1961 | Robitschek et al. | 260—617 |
| 3,014,048 | 12/1961 | Tinsley et al. | 260—348 |
| 3,042,686 | 7/1962 | O'Brien et al. | 260—348 |

OTHER REFERENCES

Bartlett et al., 68, J.A.C.S., pp. 6–8 (1946).

WALTER A. MODANCE, *Primary Examiner.*

IRVING MARCUS, *Examiner.*

N. S. MILSTONE, J. P. FRIEDENSON,
*Assistant Examiners.*